United States Patent
Miyamoto et al.

(10) Patent No.: US 10,130,999 B2
(45) Date of Patent: Nov. 20, 2018

(54) OPENING/CLOSING CONTROL DEVICE OF CHUCK

(71) Applicant: NAKAMURA-TOME PRECISION INDUSTRY CO., LTD., Hakusan-shi, Ishikawa (JP)

(72) Inventors: Takashi Miyamoto, Hakusan (JP); Tomoki Sakai, Hakusan (JP); Tomonori Arai, Hakusan (JP)

(73) Assignee: NAKAMURA-TOME PRECISION INDUSTRY CO., LTD, Hakusan-Shi, Ishikawa (JP)

( * ) Notice: Subject to any disclaimer, the term of this patent is extended or adjusted under 35 U.S.C. 154(b) by 0 days.

(21) Appl. No.: 15/414,690

(22) Filed: Jan. 25, 2017

(65) Prior Publication Data
US 2017/0209939 A1 Jul. 27, 2017

(30) Foreign Application Priority Data
Jan. 26, 2016 (JP) .................. 2016-012529

(51) Int. Cl.
*B23Q 17/00* (2006.01)
*B23B 31/30* (2006.01)

(52) U.S. Cl.
CPC ............ *B23B 31/30* (2013.01); *B23Q 17/003* (2013.01); *B23B 2231/10* (2013.01);
(Continued)

(58) Field of Classification Search
CPC . B23B 31/30; B23B 2231/10; B23B 2231/26; B23B 2260/128; B23Q 17/003; B23Q 2717/003; Y10T 279/21
See application file for complete search history.

(56) References Cited

U.S. PATENT DOCUMENTS

| 4,443,021 A | 4/1984 | Buchholz et al. |
| 4,493,041 A * | 1/1985 | Antoni ................. B23Q 17/003 |
| | | 279/4.02 |

(Continued)

FOREIGN PATENT DOCUMENTS

| DE | 19652664 C1 * | 1/1998 | ........... B23B 31/302 |
| GB | 2092924 A | 8/1982 | |

(Continued)

OTHER PUBLICATIONS

European Search Report in corresponding European Application No. 17153331 dated Jul. 5, 2017.

*Primary Examiner* — Eric A Gates
(74) *Attorney, Agent, or Firm* — Bacon & Thomas, PLLC

(57) ABSTRACT

The invention relates to a device controlling a chuck of a machine tool and an auxiliary equipment thereof, thereby facilitating a setup work. Gripping and releasing of a work are confirmed by registering a work gripping position and a work releasing position of a chuck, a kind of a used chuck, and a gripping direction of a work in an external memory device every product type of the work, transferring the work gripping position and the work releasing position in correspondence to the product type to a controller of a machine tool displaying them on a display of an operator control panel, detecting a position of an operation rod opening and closing a claw of the chuck by a stroke sensor, referring to the gripping position of the work, and detecting conformity of the detecting position and set values of the work gripping position and the work releasing position.

8 Claims, 2 Drawing Sheets

(52) U.S. Cl.
CPC ..... *B23B 2231/26* (2013.01); *B23B 2260/128* (2013.01); *B23Q 2717/003* (2013.01); *Y10T 279/21* (2015.01)

(56) References Cited

U.S. PATENT DOCUMENTS

| | | | | |
|---|---|---|---|---|
| 6,463,835 B1* | 10/2002 | Segawa | ............ | B23B 31/16025 279/4.02 |
| 7,037,248 B2* | 5/2006 | Takaku | ................ | B23Q 17/003 29/593 |
| 7,217,230 B2* | 5/2007 | Hyun | .................... | B23B 31/261 408/240 |
| 7,393,311 B1* | 7/2008 | Giovanelli | ........... | B23Q 17/003 409/131 |
| 8,579,561 B2* | 11/2013 | Inoue | .................... | B23B 31/261 409/233 |
| 8,721,238 B2* | 5/2014 | Gast | ...................... | B23B 31/265 409/232 |
| 9,352,436 B2* | 5/2016 | Hiestand | ................. | B23B 31/28 |
| 2009/0234490 A1* | 9/2009 | Suprock | ................. | B23B 31/02 700/159 |
| 2011/0135416 A1* | 6/2011 | Fry | ....................... | B23B 31/265 409/232 |
| 2015/0151395 A1* | 6/2015 | Halm | ...................... | B23Q 5/10 173/197 |
| 2016/0096227 A1* | 4/2016 | Hori | ...................... | B23B 31/302 409/233 |
| 2016/0193665 A1* | 7/2016 | Hiestand | ................. | B23B 31/26 279/126 |
| 2016/0243662 A1* | 8/2016 | Suzuki | ................. | B23Q 17/006 |
| 2016/0245380 A1* | 8/2016 | Kempter | ................. | B25J 15/0273 |
| 2018/0036854 A1* | 2/2018 | Takano | ................ | B23Q 17/003 |

FOREIGN PATENT DOCUMENTS

| | | | | |
|---|---|---|---|---|
| JP | S62-44363 A | | 2/1987 | |
| JP | 8-150503 A | | 6/1996 | |
| JP | 2005-186191 A | | 7/2005 | |
| JP | 2016128203 A | * | 7/2016 | ........... B23B 31/26 |
| WO | WO 2011124499 A1 | * | 10/2011 | ........... B23Q 17/003 |

* cited by examiner

OPENING/CLOSING CONTROL DEVICE OF CHUCK

TECHNICAL FIELD

The invention relates to a machine tool and an auxiliary equipment thereof, and more particularly to a device for controlling an opening and closing motion of a three-claw chuck and a collet chuck which grip a work forming an object to be processed.

BACKGROUND ART

A chuck gripping a work in a leading end of a main spindle is installed to a machine tool such as a lathe turning machine. In the automated lathe turning machine, the main spindle is constructed by a hollow shaft, and work gripping and releasing operation of the chuck is carried out by movement in an axial direction of an operation rod which is inserted into a hollow hole. A chuck cylinder moving the operation rod is attached to a rear end of the main spindle. Since a diameter of a portion which is gripped by the chuck is different according to a kind of the work (hereinafter, refer to as "product type"), a position of a claw of the chuck when gripping the work is different according to the product type. Therefore, a position in an axial direction of the operation rod when gripping the work is different according to the product type.

A hydraulic pressure which is necessary for the chuck to grip the work with a sufficient force is supplied to the chuck cylinder. In the case that the hydraulic pressure in a work gripping direction is supplied to the chuck cylinder in a state in which the work is inserted into the chuck, the operation rod moves in the work gripping direction, and the movement in the axial direction of the operation rod stops when the claw of the chuck grips the work with the sufficient force.

However, in the case that the claw comes into collision with something and stops before the claw grips the work, for example, due to attachment of foreign material to the work or supply of different diameter work, the work can not be gripped by the sufficient force. In order to avoid this problem, a sensor detecting a moving position in the axial direction of the operation rod is provided.

More specifically, a dog (a detection portion) moving integrally with the operation rod is provided, and a sensor such as a proximity sensor is placed at a position where the dog is positioned when the work of the product type to be processed is gripped. The hydraulic pressure in the work gripping direction is supplied to the chuck cylinder in this state, and the process of the work is started by confirming that the sensor outputs the detection signal when the movement of the operation rod stops and determining that the work is normally gripped.

In the device which confirms the gripping of the work with the proximity sensor, it is necessary to change a set position of the sensor every change of the work product type to be processed. In a general-purpose machine tool in which the product type of the work is changed frequently, it is necessary for an operator to manually set the position of the sensor every change of the product type. As a result, a load of the operator is great, and it takes a long time to change the setup of the machines when the product type is changed. Further, there is the danger that a defect product is generated and the tool is broken due to setting error, and the skill of the operator is necessary.

In order to avoid the problem, patent documents 1 and 2 have proposed to structure such that the position of the operation rod when the work is gripped can be set, for example, on the basis of a numerical value input from an operator control panel, by the provision of a stroke sensor which can continuously detect the position in the axial direction of the operation rod. The patent document 1 has also proposed to automatically set the position of the operation rod when a standard work is gripped by the chuck. According to the means, it is not necessary to carry out a complicated and skilled work of finely adjust the position of the sensor by hand. Further, it is possible to prevent the setting error to some extent by displaying the set position on the display.

CITATION LIST

Patent Documents

Patent Document 1: Japanese Unexamined Patent Publication No. 8-150503
Patent Document 2: Japanese Unexamined Patent Publication No. 2005-186191

SUMMARY OF THE INVENTION

Problem to be Solved by the Invention

As proposed in the patent documents 1 and 2, it is possible to lighten the work load of the operator when setting up due to the change of the product type and it is possible to considerably reduce the setting error by continuously detecting the position of the operation rod which opens and closes the chuck, and comparing the detecting position with a predetermined position set from the operator control panel so as to control the opening and closing motion of the chuck.

However, even if the work gripping position can be set on the basis of the numerical value input from the operator control panel, it is impossible to completely avoid the setting error due to an erroneous input, and there is a problem that it is necessary to refer to the specification of the work for knowing what value should be set when setting.

Further, in the means of the patent documents 1 and 2, only the grip position is set, and claw moves to a stroke end when releasing the work. As a result, the chuck carries out the opening and closing motion with a stroke more than necessary, and an useless time is increased in the case that a lot of works each having a short processing time are processed.

An object of the invention is to provide an opening/closing control device of a chuck which can solve the problem as mentioned above, and to provide a technical means which can easily carry out the setup work when the product type of the work changes, can approximately completely prevent a setting error of the work gripping position of the chuck, and can carry out an opening and closing motion of the chuck at a stroke which is suitable for the product type of the work.

Means for Solving Problem

An opening/closing control device of a chuck according to the invention sets a work gripping position 43 and a work releasing position 44 which are registered in an external memory device 4 every product type, in a controller 3 of a machine tool 1 which is going to process a work of the product type, and displays the positions on a display 32 of an operator control panel. The gripping and the releasing of the work are confirmed by detecting a position of an operation rod 15 which opens and closes a claw 14 of the chuck by a stroke sensor 2 (2a, 2b), and detecting conformity between the detecting position and the set values of the work gripping position 43 and the work releasing position 44. In the invention, the information such as the work gripping position 43 and the work releasing position 44 of the chuck 12 (12a, 12b), a kind 44 of the used chuck, and a work gripping direction 42 (an internal fastening or an external fastening) is registered as an electronic data in an external memory device 4 every kind (product type) of the work to be processed by the machine tool. According to the invention, it is possible to easily carry on the data which is necessary for the opening and closing operation of the chuck, set up the chuck when the product type is changed, and manage the product type data.

In the invention, it is possible to confirm the opening and closing motion, change the set values, and confirm the product type of the work and the attachment position of the claw, by displaying a detecting position 9 (9a, 9b) of the stroke sensor 2, an open position 7 (7a, 7b) and a closed position 8 (8a, 8b) of the claw 14 of the chuck corresponding to the gripping position 43 and the releasing position 44 of the work W, and stroke ends 5 (5a, 5b) and 6 (6a, 6b) of the claw 14 on a display 32 of an operator control panel.

The opening/closing control device of the chuck according to the invention is an opening/closing control device of a chuck of a machine tool which carries out an opening and closing motion of a chuck 12 gripping the work W on the basis of a movement in an axial direction of an operation rod 15 which is coupled to the claw 14 of the chuck. The device according to the invention is provided with a stroke sensor 2 which is fixed to a member (for example, a main spindle table) moving together with a main spindle 11 (11a, 11b) in an axial direction of the main spindle and continuously detects a moving position of the operation rod 15. The device according to the invention is provided with an external memory device 4 which registers a kind 41 of the chuck to be used, and the positions 43 and 44 of the operation rod 15 when the chuck 12 grips and releases the work W, and a setting means 35 which sets the positions 43 and 44 of the operation rod in a controller 3 controlling the opening and closing motion of the chuck 12 when the kind 41 of the chuck is designated. The controller 3 is provided with a grip detecting means 26 which outputs a grip signal when the detecting position 9 of the stroke sensor 2 and the work gripping position 43 conform when the operation rod 15 moves in the work gripping direction, and a release detecting means 27 which stops the movement in the axial direction of the operation rod 15 in the case that the detecting position of the stroke sensor 2 and the work releasing position 44 conform when the operation rod 15 moved in the work releasing direction.

The preferable opening/closing control device of the chuck according to the preferable invention is provided with an external memory device 4 which can be attached to and detached from the controller 3 and can be carried, and the controller 3 is provided with a set value display means 36 which displays a set value acquired from the external memory device 4 on a display 32, a state display means 38 which displays the opening and closing motion of the chuck 12 on the display 32, and a set value changing means 37 which changes the set value.

The opening/closing control device of the chuck according to the invention can be applied to the opening and closing motion of the chuck of a loader which automatically carries the work in the machine tool, in addition to the opening and closing motion of the chuck for gripping the work which is attached to the main spindle of the machine tool. For example, in the case that a plurality of work gripping positions are set in the controller of the loader, and the product types of the works are registered in correspondence to the respective set values, it is possible to make the machine tool execute the machining processes corresponding to the product type, by discriminating the product type of the gripped work on the basis of which set value the detection value of the stroke sensor provided in the chuck conform to, when the loader grips the work.

Effect of the Invention

It is possible to easily and rapidly carry the data and set the data in the controller when setting up, by registering the information of the chuck to be used every product type of the work to be processed, the work gripping direction, and the stroke for opening and closing the chuck as the electronic data, it is possible to prevent the set error of the work gripping position and releasing position, it is possible to confirm the position change of the claw in the chuck during processing, and it is possible to detect abnormality in the machine.

More specifically, according to the invention, the work load when setting up can be widely lightened since the position adjustment of the sensor is not necessary, and it is possible to prevent the adjustment error and dispersion of adjustment by the worker. Further, it is possible to easily find the error in the used chuck when setting up, the error in the attaching position of the claw, and the error in the work.

MODE(S) FOR CARRYING OUT THE INVENTION

Figure 1:
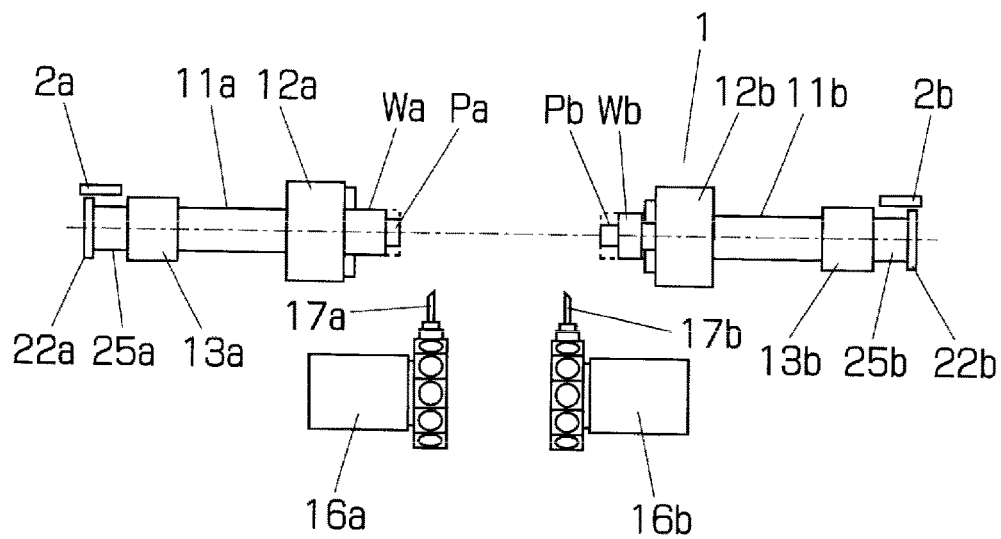
FIG. 1 is a block diagram showing an example of a machine tool which employs the invention.
Figure 2:
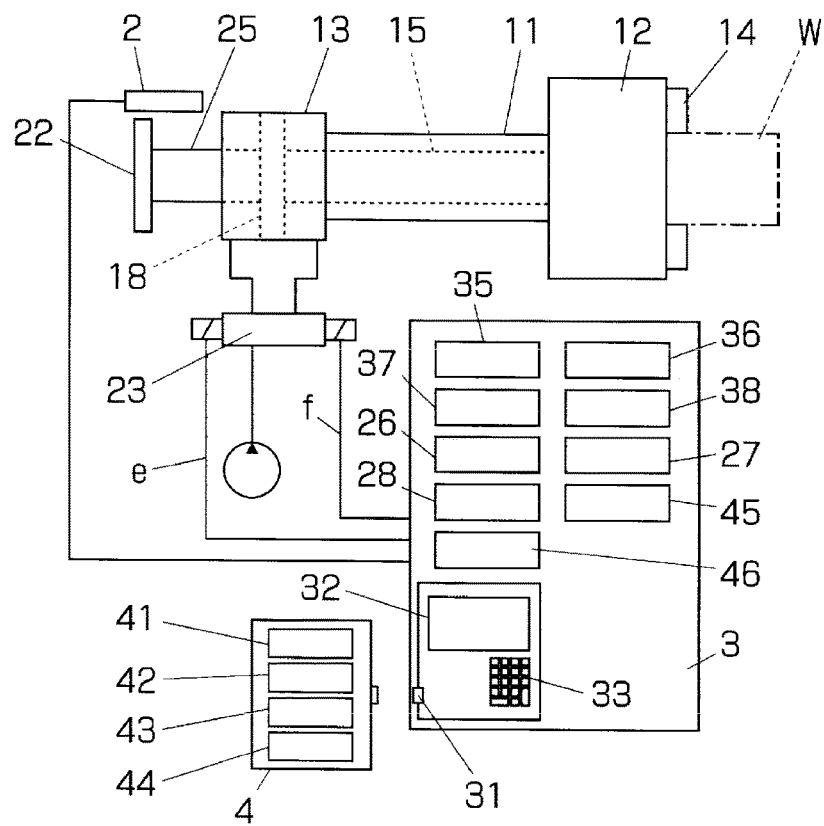
FIG. 2 is a block diagram showing a substantial part and a control system in the device in FIG. 1.

A description will be given below of an embodiment of the invention by exemplifying a two-main spindle opposed lathe turning machine. FIG. 1 is a block diagram schematically showing a machine body of the two-main spindle opposed lathe turning machine, and FIG. 2 is a block diagram showing a substantial part and a control system thereof. In the drawings, reference numeral 1 denotes a machine body, reference numeral 3 denotes a controller, and reference numeral 4 denotes an external memory device such as a USB memory.

The machine body 1 is provided with two main spindles 11 (11a, 11b) which are opposed on the same axis. A chuck 12 (12a, 12b) gripping a work W (Wa, Wb) is attached to a leading end (an opposed end) of each of the main spindles, and a chuck cylinder 13 (13a, 13b) carrying out an opening and closing motion of the chuck 12 is attached to a rear end thereof. The main spindle 11 is constructed by a hollow shaft, and is operationally coupled to each of chuck claws 14 and a piston 18 of the chuck cylinder 13 by an operation rod 15 which passes a hollow hole of the main spindle 11, as shown in FIG. 2. The operational coupling means coupling via a mechanism which converts a movement in an axial direction of the operation rod 15 into a movement in a radial direction of the claw 14.

A raw material work Wa is griped by the chuck 12a in a left side of the drawing, and is processed its right part Pa by a cutting tool 17a which is attached to a cutting tool post 16a. Next, the processed part Pa of the work Wa is gripped by the right chuck 12b on the basis of an approaching motion of both the chucks 12a and 12b and an opening and closing motion of the claw 14, the left part Pb is processed by a cutting tool 17b which is attached to a cutting tool post 16b, and the processed work is carried out of the machine.

As shown in FIG. 2, a dog rod 25 (25a 25b in FIG. 1) extending in an opposite side of the operation rod 15 is fixed to the piston 18 of the chuck cylinder 13. The dog rod 25 extends in an opposite side to the chuck of the chuck cylinder 13, and is provided in its rear end with a dog (a detection end) 22 (22a and 22b in FIG. 1). Further, a stroke sensor 2 (2a and 2b in FIG. 1) detecting a position of the dog 22 is fixedly provided in a main spindle table (not shown). A structure of the stroke sensor 2 is not particularly limited, however, can utilize, for example, a sensor of a type detecting a position of the dog 22 on the basis of an inductance change of a coil which is arranged in a parallel direction to a moving direction of the dog 22. A position signal of the dog 22 detected by the stroke sensor 2 is sent to the controller 3.

A hydraulic pressure is supplied to the chuck cylinder 13 via an electromagnetic valve 23 which switches the moving direction of the operation rod 15. Electric signals e and f switching the electromagnetic valve 23 are output from the controller 3. Therefore, the controller 3 can recognize the moving direction of the piston 18, that is, the opening and closing direction of the claw 14. The moving direction of the piston 18 can be recognized to the controller 3 by continuously detecting the detection signal of the stroke sensor 2.

Data of a kind 41 of the chuck, a gripping direction 42, a work gripping position 43 and a work releasing position (or a gripping stroke) 44 is registered in the external memory 4 in relation to each of the right and left chucks 12 every product type of the work to be processed. The kind 41 of the chuck is data, for example, indicating whether the chuck is a three-claw chuck or a collet chuck, and the gripping direction 42 indicates whether the work is gripped under an internal fastening, that is, in a state in which the claw 14 of the chuck is energized in an opening direction (an outer peripheral direction), or the work is gripped under an external fastening, that is, in a state in which the claw 14 of the chuck is energized in a closing direction (a center direction).

The external memory device 4 may be a device which registers the above data 41 to 44 in relation to a plurality of product types of the work. Further, the external memory device 4 may be a device which registers a specification 45 and a processing program 46 of the work together with the above data 41 to 44, in relation to a specific work.

Figure 3:
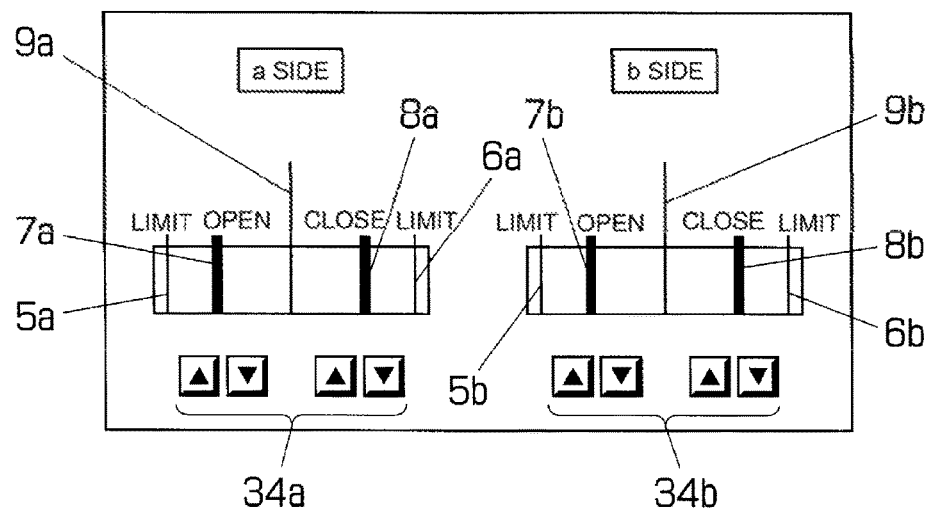
FIG. 3 is a view showing a display example of a display screen.

The controller 3 is provided with a connector 31 which connects the external memory device 4, and a display 32 and a ten key 33 which are constructed by a touch panel. Further, the controller 3 is provided with a setting means 35 which reads and sets the kind 41 of the chuck, and the work gripping direction, the work gripping position 42 and the work releasing position (or the gripping stroke) 44 in relation to the chuck from the external memory device 4. Further, the controller 3 is provided with a set value display means 36 which displays the set value on the display 32 according to an aspect shown in FIG. 4, a set value changing means 37 which changes the setup set value by a push button 34 and the ten key 33 on the touch panel, and a state display means 38 which displays the current set state on the display 32 according to an aspect as shown in FIG. 3.

Further, the controller 3 is provided with a grip detecting means 26 which outputs a grip signal in the case that the detecting position of the stroke sensor 2 and the set work gripping position 43 conform, and a release detecting means 27 which switches the electromagnetic value 23 and stops the supply of the working fluid to the chuck cylinder 13 in the case that the detecting position of the stroke sensor 2 and the set work releasing position 44 conform. The specification data 28 of the machine body 1 such as the stroke ends 5 (5a, 5b) and 6 (6a, 6b) of the chuck cylinder 13 shown in FIG. 3 is registered in the controller 3. In the example in FIG. 1, the specification data 45, for example, a material and a part number of the work to be processed, and a processing program 46 are registered in the controller 3 side.

Next, a description will be given of a motion of the above device in the case that the data about a plurality of product types is registered in the external memory device 4, and the specification 45 and the processing program 46 of the work to be processed are registered in the controller 3.

Figure 4:
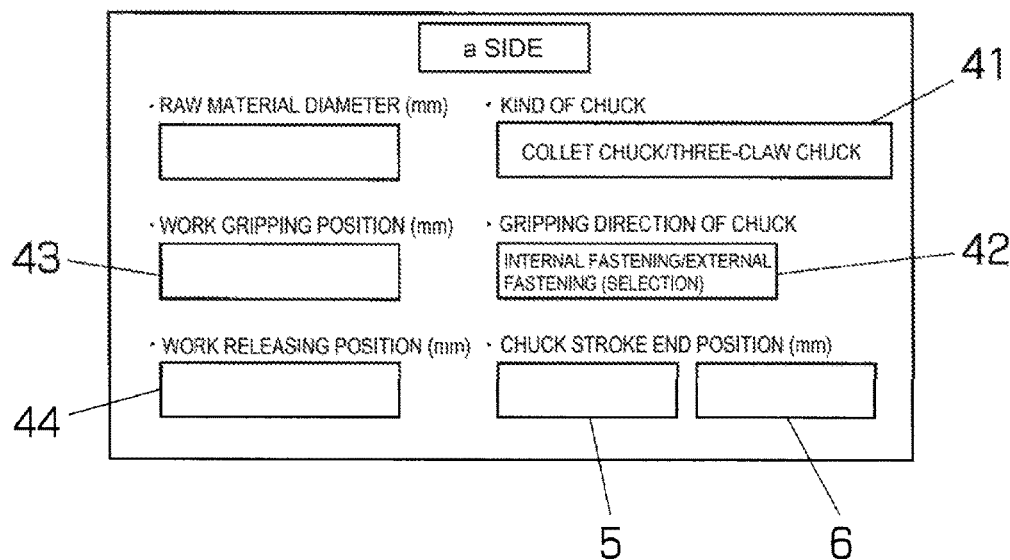
FIG. 4 is a view showing an example of a confirmation and change screen of a set value in a left chuck.

In the case that the operator connects the external memory device 4 to the controller 3, the setting means 35 of the controller reads the data of the kind 41 of the chuck, the gripping direction 42, the work gripping position 43 and the work releasing position 44 in relation to the product type of the object to be processed, and sets in respective setting devices of the controller 3. In the case that the gripping stroke is registered in place of the work releasing position in the external memory device 4, a value obtained by adding or subtracting the gripping stroke to or from the work griping position is set as the work releasing position with reference to the gripping direction. The set value display means 36 of the controller 3 displays the read set value on the display 32 of the controller, for example, as shown in FIG. 4. Here, the stroke ends 5 and 6 correspond to a moving end of the piston 18 or a moving end of the dog 22 detected by the stroke sensor 2, and is a fixed value which is defined according to the specification of the machine body 1 or the stroke sensor 2.

In the case that the operator confirms the motion, a screen as shown in FIG. 3 is displayed on the display 32 by a state display means 38. On the screen, there are displayed the open side stroke end 5 (5a, 5b), the closed side stroke end 6 (6a, 6b), an open position 7 (7a, 7b) and a closed position 8 (8a, 8b) of the claw 14 corresponding to the set work gripping position 43 and releasing position 44, a button 34 (34a, 34b) which increases and decreases the closed position and the open position, and a current position 9 (9a, 9b) of the operation rod 15 or the chuck claw 14, in relation to an a side, that is, the left chuck 12a, and a b side, that is, the right chuck 12b.

Since the work is gripped in an outer diameter side (external fastening) in many cases, the closed position 8 comes to the work gripping position 43, and the open position 7 comes to the work releasing position 44, however, in the case that the work is gripped in an inner diameter side (internal fastening), the open position 7 comes to the work gripping position 43, and the closed position 8 comes to the work releasing position 44. In the case that a test work is gripped or released in such a display state as mentioned above, the current position 9 moves right and left, and stops at the open position 7 and the closed position 8.

When the detecting position 9 of the stroke sensor stops in a deflecting state from the closed position 8 corresponding to the work gripping position in the case of the external fastening work, the work may not be appropriately gripped, that is, the test may be carried out by using an erroneous work, or the set value may be erroneous. Further, when the detecting position 9 stops in a deflecting state from the open position 7 corresponding to the work releasing position, there is the possibility that any trouble may be generated in the opening and closing device of the claw 14. As a result, it is necessary to check them. Further, in the case that the stop positions in the gripping side and the releasing side deflect in the same direction, a position of a serration installed between the chuck body and the claw may be erroneous when the claw 14 is attached. As a result, it is necessary to check them.

In the case that the set value is determined to be error as a result of the confirmation, the confirming work is carried out by changing the set value on the basis of the operation of the push button 34, or the operation of the ten key 33 by displaying the screen in FIG. 4. Further, after confirming that there is no problem, the continuous process of the work is started.

The above example is an example in the case that only the chuck data about a plurality of product types is registered in the external memory device 4, however, the external memory device 4 may be prepared every product type of the work, the specification 45 of the work and the processing program 46 may be registered in the external memory device 4 together with the data 41 to 44 of the chuck, and all the data necessary for processing the work of a certain product type may be set from the external memory device in the controller 3 by the setting means 35. Further, the external memory device 4 may be a memory device of a management computer which collectively manages the controllers 3 of a plurality of machine tools. In this case, the data 41 to 44 are transferred together with the processing program 46 to the controllers 3 of the respective machine tools from the management computer.

Further, the above description relates to the example of the chuck of the lathe turning machine, however, the present invention is not limited to the lathe turning machine, but can be utilized as a device controlling the opening and closing motion of the other machine tools having the chuck gripping plural kinds of works, and the chuck of a loader and an unloader additionally provided in the machine tool.

EXPLANATION OF LETTERS OR NUMERALS 1 machine body
2 (2a, 2b) stroke sensor
3 controller
4 external memory device
7 open position of chuck claw
8 closed position of chuck claw
9 detecting position of stroke sensor
11 (11a, 11b) main spindle
12 (12a, 12b) chuck
13 chuck cylinder
14 claw of chuck
15 operation rod
22 dog
26 grip detecting means
27 release detecting means
32 display
35 setting means
36 set value display means
37 set value changing means
38 state display means
41 kind of chunk
42 work gripping direction
43 work gripping position
44 work releasing position
W (Wa, Wb) work

The invention claimed is:

1. An opening/closing control device of a chuck which carries out an opening and closing motion of a chuck (12) gripping a work (W) on the basis of a movement in an axial direction of an operation rod (15) coupled to a claw (14) of the chuck, the chuck opening/closing control device comprising:

a stroke sensor (2) which detects a moving position of said operation rod and generates a position signal corresponding to said moving position;

a controller (3) controlling the opening and closing motion of said chuck, wherein the controller (3) receives said position signal from said stroke sensor (2) and outputs at least one electric signal to control the movement of said operation rod (15); and an external memory device (4) connectible to said controller which stores a position of said operation rod when said chuck grips and releases said work, in connection with each of a plurality of product types of said work;

wherein the controller includes a setting means (35) which sets a work gripping position (43) and a work releasing position (44) of the work of the product type when the product type of said work is designated, a grip detecting means (26) which outputs a grip signal in the case that the detecting position of said stroke sensor and said set work gripping position conform when said operation rod moves in the work gripping direction, and a release detecting means (27) which stops the movement in the axial direction of the operation rod in the case that the detecting position of said stroke sensor and said set work releasing position conform when said operation rod moves in the work releasing direction.

2. The opening/closing control device of the chuck according to claim 1, wherein said external memory device is an external memory device which is attachable to and detachable from said controller and is capable of being carried.

3. The opening/closing control device of the chuck according to claim 2, wherein said controller comprises a set value display means (36) which displays a set value, a state display means (38) which displays an opening and closing motion of said chuck in a state in which the set value is set, and a set value changing means (37) which changes said set value.

4. The opening/closing control device of the chuck according to claim 3, wherein said external memory device registers whether the gripping direction of the chuck is an external fastening or an internal fastening, and said release detecting means stops the movement in the axial direction of the operation rod in the case that a conformity signal with said work releasing position is output when said operation rod moves in the opening direction of the chuck if the external fastening is set, and stops the movement in the axial direction of the operation rod in the case that a conformity signal with the work releasing position is output when said operation rod moves in the closing direction of the chuck if the internal fastening is set.

5. The opening/closing control device of the chuck according to claim 2, wherein said external memory device registers whether the gripping direction of the chuck is an external fastening or an internal fastening, and said release detecting means stops the movement in the axial direction of the operation rod in the case that a conformity signal with said work releasing position is output when said operation rod moves in the opening direction of the chuck if the external fastening is set, and stops the movement in the axial direction of the operation rod in the case that a conformity signal with the work releasing position is output when said operation rod moves in the closing direction of the chuck if the internal fastening is set.

6. The opening/closing control device of the chuck according to claim 1, wherein said controller comprises a set value display means (36) which displays a set value, a state display means (38) which displays an opening and closing motion of said chuck in a state in which the set value is set, and a set value changing means (37) which changes said set value.

7. The opening/closing control device of the chuck according to claim 6, wherein said external memory device registers whether the gripping direction of the chuck is an external fastening or an internal fastening, and said release detecting means stops the movement in the axial direction of the operation rod in the case that a conformity signal with said work releasing position is output when said operation rod moves in the opening direction of the chuck if the external fastening is set, and stops the movement in the axial direction of the operation rod in the case that a conformity signal with the work releasing position is output when said operation rod moves in the closing direction of the chuck if the internal fastening is set.

8. The opening/closing control device of the chuck according to claim 1, wherein said external memory device registers whether the gripping direction of the chuck is an external fastening or an internal fastening, and said release detecting means stops the movement in the axial direction of the operation rod in the case that a conformity signal with said work releasing position is output when said operation rod moves in the opening direction of the chuck if the external fastening is set, and stops the movement in the axial direction of the operation rod in the case that a conformity signal with the work releasing position is output when said operation rod moves in the closing direction of the chuck if the internal fastening is set.

\* \* \* \* \*